July 10, 1956  P. S. DOUGHERTY  2,753,826
MACHINE FOR MANUFACTURE OF TANKS AND VESSELS
Filed Aug. 1, 1952  2 Sheets-Sheet 1
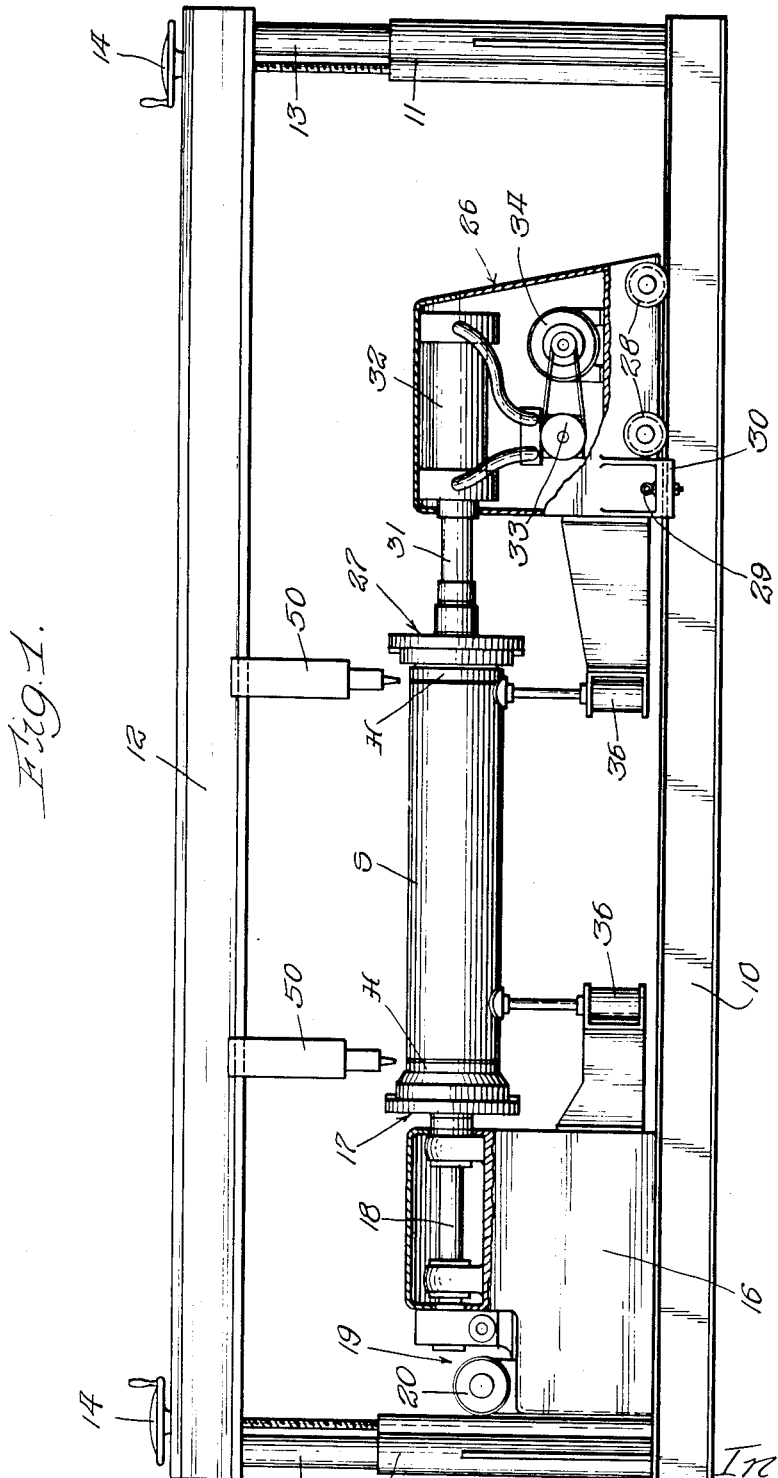
Inventor:
Paul S. Dougherty
By Schraeder, Merriam, Hofgren, Brady & Betty July 10, 1956
P. S. DOUGHERTY
2,753,826
MACHINE FOR MANUFACTURE OF TANKS AND VESSELS
Filed Aug. 1, 1952
2 Sheets-Sheet 2
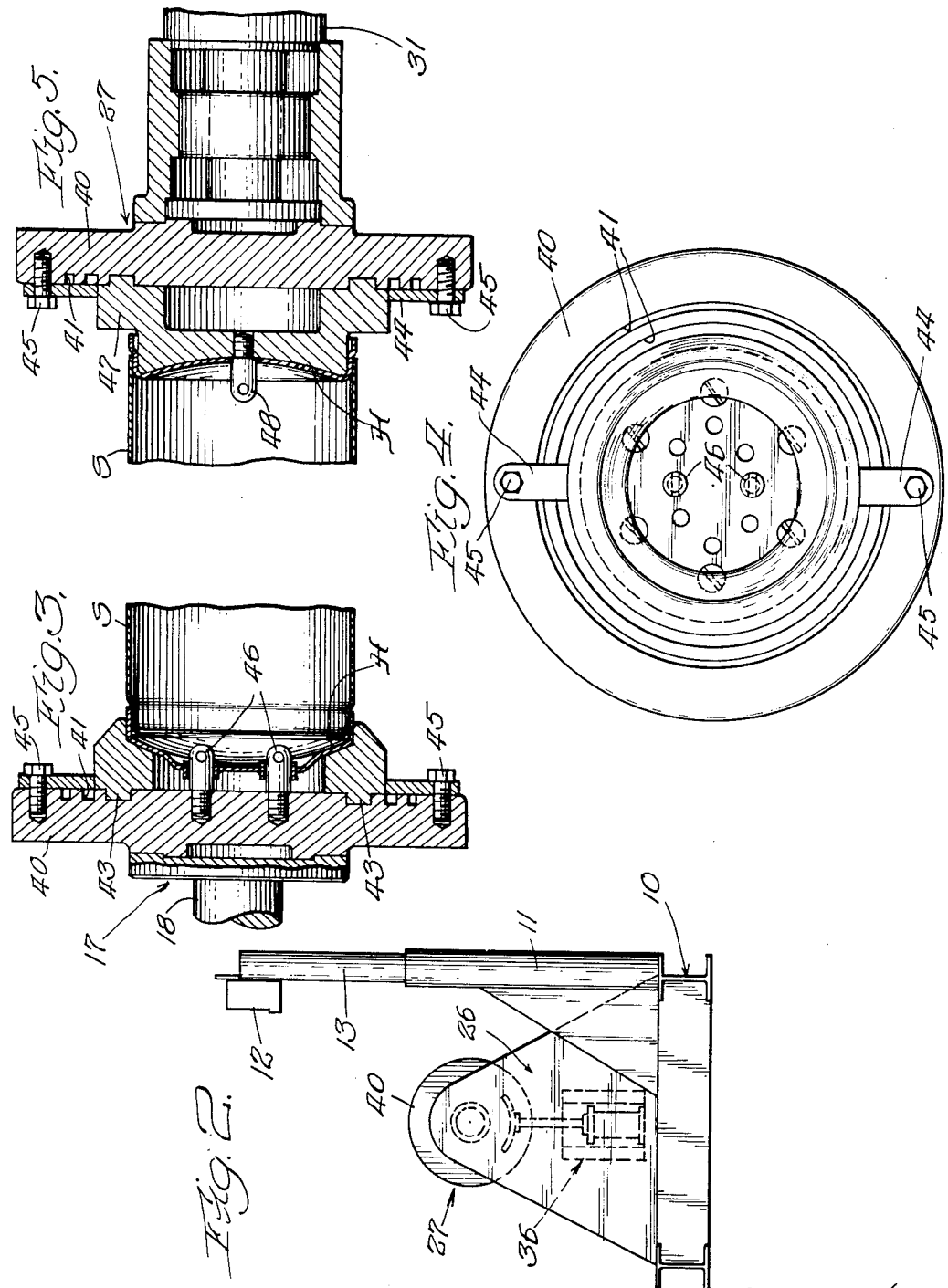
Inventor:
Paul S. Dougherty
By Schroeder, Merriam,
Hofgren & Brady, Attys.

United States Patent Office 2,753,826
Patented July 10, 1956

2,753,826

MACHINE FOR MANUFACTURE OF TANKS AND VESSELS

Paul S. Dougherty, La Grange, Ill., assignor to Metal Coating Corporation, a corporation of Illinois Application August 1, 1952, Serial No. 302,188

6 Claims. (Cl. 113—59)

This invention relates to a machine for assembling and welding pressure storage vessels and particularly sheet metal vessels having mainly three parts including a cylindrical shell and end closures for the shell.

The tank referred to herein is that type of vessel used primarily for domestic hot water heaters, water softening tanks and any other use requiring a pressure storage vessel of this particular type. By way of example the vessel may range from nine inches in diameter up to twenty-four and in length from a minimum of twelve inches to as much as eighty-four inches. These dimensions are not to be taken as exclusive as the principles of the invention to be described may be applied to the construction of smaller or larger vessels.

The shell of the vessel is usually manufactured from sheet metal cut and rolled to form a cylinder. The meeting edges are welding to form a longitudinal seam in the shell. The end closures, sometimes referred to as heads and bottoms, are formed of heavier gauge material and are suitably pierced by openings in which threaded couplings or nipples may be welded. The shell and the heads are assembled and welded together to form the complete tank with all necessary connections properly located in the shell and heads.

Pressure vessels of this nature have been manufactured for some time. The usual process of manufacturing has entailed a number of hand operations greatly increasing the cost of the vessels. The advent of submerged arc welding has lowered the cost somewhat but has not eliminated manual operations prior to the welding. Heretofore it has been customary for a skilled workman to clamp a vessel shell between his legs and skillfully tap a head into one end of the shell. This workman then turned to the other end of the shell and likewise tapped a bottom in position. This assembly was then passed to a semi-skilled worker who carefully measured to see that the bottom had proper clearance and if it did not, would tap it into such a position. This positioning was necessary so that the welding jig would be properly operative. The jig consisted of driven rollers upon which the shell of the tank was laid so that it could be rotated about its axis while the welding heads positioned at each end of the shell performed the welding operation. After welding, the tank was ready for testing.

The machine of the present invention requires but a single operator to perform what amounts to all the operations described above. The head, bottom and shell are placed in the machine where assembly and welding takes place without manual handling and a complete vessel is taken out of the machine ready for testing.

An exemplary embodiment of the invention will be described in connection with the accompanying drawings, in which:

Figure 1 is a side elevational view of the machine;

Figure 2 is an end view of the machine taken from the right-hand end of Figure 1;

Figure 3 is a fragmentary enlarged sectional view through one of the work holders;

Figure 4 is a front view of the holder shown in Figure 3 with the ring removed; and Figure 5 is a fragmentary enlarged sectional view through the other work holder with a jig for holding an inwardly dished head.

The basic parts of the machine may be best seen from Figures 1 and 2 wherein the base frame 10 is shown as a pair of spaced rails above which extend upright standards 11 at the ends for adjustably supporting a welding head supporting rail 12. Guides 13 are telescopically enclosed in the standards 11 for guiding the vertical travel of the rail 12 initiated by means of the handwheel screws 14 at opposite ends of the rail. The base frame is intended for proper mounting on the floor of a manufacturing plant and may be conveniently placed with relation to conveyors bringing the parts of the vessel to the machine.

The operating parts of the machine are supported within and on the base frame. A head stock member 16 is permanently mounted at one end of the base rails. A work holder, generally indicated 17, is mounted on a rotatable shaft 18 which may be driven by a variable speed drive means 19. A manual control (not shown) for the motor 20 is provided so that the work holder may be rotated at desired speeds.

Opposed to the work holder 17 of the head stock member is a similar work holder 27 supported by a tail stock member 26. Unlike the head stock member, the tail stock member is mounted on wheels 28 positioned to roll in the rails of the base frame 10. In this manner the tail stock location can be varied with relation to the head stock member and when properly positioned may be secured by means of bolts 29 extending through a fixture 30 on the member and through openings in the rails of the base frame. The work holder 27 is idly rotatable upon the shaft 31 so that a fluid pressure ram 32 may move the holder 27 toward the opposed holder 17. In the instant case, the ram 32 is a hydraulic piston and cylinder device driven by a pump 33 and motor 34.

Intermediate the work holders 17 and 27 are a pair of hydraulic shell support members 36 each carried respectively from the head stock and tail stock members. These shell supports may be activated by the operator to lift and properly position the shell S with relation to the heads H held in the work holders. Some of the smaller sized vessels have shells which may be more conveniently lifted by hand but the large sizes are of sufficient weight to require mechanical means for handling.

The machine is intended for universal use on a number of sizes of pressure storage vessels. Figures 3–5 show the details of the work holders which permit the adaptation of the machine for assembling vessels of various sizes. Each work holder has a face plate 40 supported directly from the head or tail stock member, as the case may be. The face of the plate is provided with a number of concentric grooves 41 for the reception of various sized jigs. In Figure 3, the jig 42 comprises a ring having an inwardly projecting portion 43 reposing in one of the annular grooves 41. This ring is intended to receive and hold an outwardly dished end closure or head for the vessel and is supported on the face plate by means of lugs 44 and machine screws 45. Inside the ring, the pins 46 are located with relation to the ring so as to enter previously prepared openings in the head H. These aligning pins help to hold the head in the holder until the vessel is assembled.

In Figure 5, a work holder for an inwardly dished head is shown. This jig 47 differs from the jig 42 in that its outermost portion has a contour to rest against the inwardly dished head and the pin 48 is mounted in the jig. The attaching lugs or ears 44 are similar to those used on the ring 42. It will be noted that for each work holder, the jig provides a sufficient space between the juncture of the shell and head and the jig itself, for reception of flux from the submerged arc welding apparatus.

The welding heads 50 are supported from the rail 12 and are mounted for movement along the rail so that they may be positioned at the junctures of the shell and end closures. Each welding head 50 is one of the known commercial heads for performing submerged arc welding. The welding wire and flux are automatically fed as the welding progresses. In the present instance, the welding rate is determined by the rate at which the work holder 17 rotates the assembled vessel. This speed is chosen so as to be proper prior to the assembly of a vessel in the work holder.

In operation, a workman places a head in the work holder 17 and a bottom in the work holder 27 and thereafter properly locates a vessel shell S on the supports 36 between the end closures. A manual control may then be used to operate the hydraulic pressure means 32 to force the shells and heads together to assemble the vessel. This is done in accordance with the teachings of my copending application Serial No. 302,189, filed August 1, 1952, preferably with the structure of the vessel as illustrated therein. A pressure regulator with a relief valve is provided on the fluid pressure piston so that a predetermined pressure is placed on the tank. This may vary with different sizes of the tanks, between 1,000 to 2,800 pounds per square inch in the specific example illustrated. The supports 36 for the shell are lowered out of the way and the drive means started to rotate the vessel about its axis while the welding heads weld the heads and shells together. In presently known operations, other than the described operation, the assembled tanks are mounted on rollers that turn the tank by frictional contact with the shell. Shells that are assembled by rolling sheet stock into a cylinder and then longitudinally welding a seam therein, are not absolutely round causing a variance in the spacing between the welding groove and weld wire. This difficulty has caused a considerable number of rejected vessels. The present machine rotates the vessel about its axis without regard to the shell configuration so that the welding heads may properly perform their operation.

The welding at each juncture of the shell and end closure portions, when conducted under the assembly pressure results in making a tank which will withstand considerable more internal pressure than a tank made of the same material welded at the ends without such external assembly pressure. The welds at the junctures mentioned are ordinarily the weakest portion of the vessel and when welded under pressure as herein, the vessel will withstand nearly two and one half times as much pressure as when welded otherwise.

Once the welding is complete, the pressure may be released and the finished vessel removed from the machine ready for testing and subsequent use. In order to change the machine from manufacturing one size of tank to another, it is necessary to make only a few changes. The jigs on the face plates of both work holders are changed to fit the new size. An adjustment is made in the pressure to be exerted in assembly as well as the speed of rotation for the welding. Other adjustments are made to accommodate the proper length of vessel and to locate the welding heads in proper position. The total change from one size to another may be accomplished in a matter of minutes with little loss in production time.

The foregoing detailed description has been given for clearness of understanding only, and no unnecessary limitations should be understood therefrom, for some modifications will be obvious to those skilled in the art.

I claim:

1. A machine for assembling and welding sheet metal pressure storage vessels, comprising: axially aligned, opposed rotatable work holders one of which is movable toward the other and each having means thereon for holding an end closure for a vessel; means for temporarily supporting a vessel shell between and apart from the work holders; pressure applying means operable upon the movable work holder for moving it toward the other for forcibly assembling the end closures held by said work holders on the vessel shell supported therebetween; and welding heads above the junctures of said closures and shell for welding the three together, said work holders supporting the assembled vessel and rotating it about its axis without regard to the shell contour during the welding of said junctures and while maintaining assembly pressure on said end closures.

2. A machine as defined in claim 1 wherein each work holder has a face plate and a bearing member having end closure contours, secured thereto, the face plate having guiding pins extending outwardly to engage similar openings in the end closures.

3. A machine as defined in claim 1 wherein each work holder includes a face plate and a bearing member thereon contoured to hold and press against an end closure, said bearing members holding the end closures outwardly to provide welding head clearance between the member and shell.

4. A machine as defined in claim 1 wherein each work holder includes a permanent face plate and a removable bearing member secured thereto for pressing an end closure against a shell, and said face plate including concentric bearing member centering rings and peripheral securing means for said members whereby members for different end closures may be alternately secured to the face plate.

5. A machine for assembling and welding sheet metal pressure storage vessels, comprising: axially aligned, opposed rotatable work holders one of which is movable toward the other and each having a portion adapted to hold one end closure of a vessel; a retractable vessel shell support intermediate the work holders for aligning a vessel shell with said end closures; a pressure ram for moving the movable work holder forcibly toward the other to pressure assemble the end closures and the vessel shell; motor means for rotating one of said work holders to rotate the assembled vessel about its axis while supported only by the work holders; and welding heads positioned above the vessel to weld the vessel end closures and shell together while rotated and held under the assembly pressure.

6. A machine for assembling and welding sheet metal storage vessels, comprising: a base frame; a head stock member on the frame having a rotatable work holder for one end closure of the vessel; variable speed drive means for turning said holder; a tail stock member selectively movable over the frame toward and from the head stock member and having a rotatable work holder for the other end closure of the vessel; means for temporarily supporting a vessel shell between and apart from the work holders, said holders aligning the vessel ends horizontally with said shell; a fluid pressure ram for moving the tail stock holder toward the head stock holder to forcibly assemble the vessel end closures and shell, said pressure ram being independent of said variable drive means whereby the assembled vessel may be rotated about its axis while maintained under assembly pressure and without regard to shell contour; and welding heads supported above the assembled vessel by said base frame in position to weld the end closures and shell together as the vessel is rotated.

References Cited in the file of this patent

UNITED STATES PATENTS

| | | |
|---|---|---|
| 1,638,024 | Woodrow | Aug. 9, 1927 |
| 1,791,781 | Wilson | Feb. 10, 1931 |
| 2,091,307 | Catlett et al. | Aug. 31, 1937 |
| 2,256,988 | Michailoff | Sept. 23, 1941 |
| 2,303,720 | Berkeley | Dec. 1, 1942 |
| 2,313,393 | Mitchell | Mar. 9, 1943 |
| 2,349,865 | Hawk et al. | May 30, 1944 |
| 2,459,954 | Morgan | Jan. 25, 1949 |
| 2,479,197 | Anderson | Aug. 16, 1949 |
| 2,517,853 | Eickmeyer | Aug. 8, 1950 |
| 2,558,005 | Sciaky | June 26, 1951 |